(12) United States Patent
Strasser et al.

(10) Patent No.: US 7,994,089 B2
(45) Date of Patent: Aug. 9, 2011

(54) DE-ALLOYED PLATINUM NANOPARTICLES

(75) Inventors: Peter Strasser, Houston, TX (US);
Shirlaine Koh, Houston, TX (US);
Prasanna Mani, Houston, TX (US);
Srivastava Ratndeep, Houston, TX (US)

(73) Assignee: University of Houston System, Houston, TX (US)

( * ) Notice: Subject to any disclaimer, the term of this patent is extended or adjusted under 35 U.S.C. 154(b) by 276 days.

(21) Appl. No.: 12/206,587

(22) Filed: Sep. 8, 2008

(65) Prior Publication Data

US 2009/0114061 A1   May 7, 2009

Related U.S. Application Data

(60) Provisional application No. 60/970,851, filed on Sep. 7, 2007.

(51) Int. Cl.
*B01J 23/00* (2006.01)
*B01J 21/00* (2006.01)
*B01J 20/00* (2006.01)

(52) U.S. Cl. ............ 502/300; 502/4; 502/10; 502/104; 502/107; 502/111; 502/150; 502/305; 502/319; 502/321; 502/324; 502/325; 502/326; 502/332; 502/333; 502/334; 502/335; 502/337; 502/339; 502/344; 502/347; 502/350; 502/353; 502/355

(58) Field of Classification Search ............... 502/4, 10, 502/104, 107, 111, 300–355, 415, 439, 150
See application file for complete search history.

(56) References Cited

U.S. PATENT DOCUMENTS

| | | | | |
|---|---|---|---|---|
| 7,101,639 | B2 * | 9/2006 | Gorer et al. | 429/524 |
| 7,169,731 | B2 * | 1/2007 | Chondroudis et al. | 502/185 |
| 7,422,994 | B2 * | 9/2008 | Chondroudis et al. | 502/185 |
| 7,537,803 | B2 * | 5/2009 | Wang et al. | 427/212 |
| 7,662,740 | B2 * | 2/2010 | Chondroudis et al. | 502/180 |
| 7,811,965 | B2 * | 10/2010 | Cendak et al. | 502/326 |
| 2005/0170222 | A1 * | 8/2005 | Strasser et al. | 429/13 |
| 2007/0010396 | A1 * | 1/2007 | Giaquinta et al. | 502/345 |
| 2008/0095852 | A1 * | 4/2008 | Kong et al. | 424/489 |

* cited by examiner

*Primary Examiner* — Cam N. Nguyen
(74) *Attorney, Agent, or Firm* — Conley Rose, P.C.

(57) ABSTRACT

A method of producing de-alloyed nanoparticles. In an embodiment, the method comprises admixing metal precursors, freeze-drying, annealing, and de-alloying the nanoparticles in situ. Further, in an embodiment de-alloyed nanoparticle formed by the method, wherein the nanoparticle further comprises a core-shell arrangement. The nanoparticle is suitable for electrocatalytic processes and devices.

24 Claims, 10 Drawing Sheets

DE-ALLOYED PLATINUM NANOPARTICLES

CROSS-REFERENCE TO RELATED APPLICATIONS

This application claims the benefit under 35 U.S.C. §119(e) of U.S. Provisional Patent Application No. 60/970,851, filed Sep. 7, 2007, the disclosure of which is hereby incorporated herein by reference.

STATEMENT REGARDING FEDERALLY SPONSORED RESEARCH OR DEVELOPMENT

The U.S. Government has a license paid in full, covering the scope of this invention and the right in limited circumstances to require the patent owners to license others on reasonable terms as provided for by the terms of Contract No. DE-AC02-76SF00515 awarded by the U.S. Department of Energy.

BACKGROUND

1. Field of the Invention

This invention relates generally to the field of electrocatalysis. More specifically, the invention relates to a method of creating de-alloyed electrocatalytic nanoparticles.

2. Background of the Invention

Electrochemical cells are devices that use the process of changing oxidation sates, during chemical reactions, to generate electricity. An electrochemical cell contains two terminals, an anode, and a cathode. An oxidation reaction occurs at the anode while a reduction reaction takes place at the cathode. This results in electron flow from the anode to the cathode (or positive current in the opposite direction).

Fuels cells and batteries are examples of electrochemical cells. Batteries are closed systems, some of which could be recharged for reuse. On the other hand, fuel cells require fuel, which is depleted during operation and must be replenished. This fuel is electrochemically oxidized to produce electricity on demand. Ethanol, methanol, and hydrogen are some examples of fuel that have been used in fuel cells.

In fuel cells that use hydrogen as fuel, hydrogen is oxidized at the anode (i.e. hydrogen loses electrons) and the oxygen is reduced at the cathode, water is the only product of this reaction. This reaction has a potential to produce electricity at 1.23 V, which is the potential difference of the occurring half-reactions.

In hydrogen/oxygen fuel cells, the oxygen reducing reaction (ORR) electrode (cathode) catalyst material of choice has been platinum (Pt) for decades. The ORR on Pt, however, is very irreversible causing large over-potential which significantly reduces the fuel cell efficiency. Much research has therefore been dedicated to identify more efficient catalyst systems with reduced precious metal content and improved ORR activity to enable the path to fuel cell commercialization. Pt rich alloys, most prominently platinum-cobalt formulations, have shown promise with state-of-art activity improvements of up to a factor of 2.5-3 times over pure Pt metal. However, to date a catalyst capable of performing suitably for automotive fuel cell applications is lacking.

Consequently, there is a continuing need for better fuel cell catalysts and thus for: (i) synthesis of new materials with higher catalytic activity, (ii) new methods for synthesis, and (iii) methods that lead to efficient functioning of the catalysts.

BRIEF SUMMARY

A method of producing de-alloyed nanoparticles. In an embodiment, the method comprises admixing metal precursors, freeze-drying, annealing, and de-alloying the nanoparticles in situ. Further, the de-alloyed nanoparticle formed by the method, wherein the nanoparticle further comprises a core-shell or nano-porous arrangement. The nanoparticle is suitable for electrocatalytic processes and devices.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Electrocatalyic Nanoparticles

Figure 1:
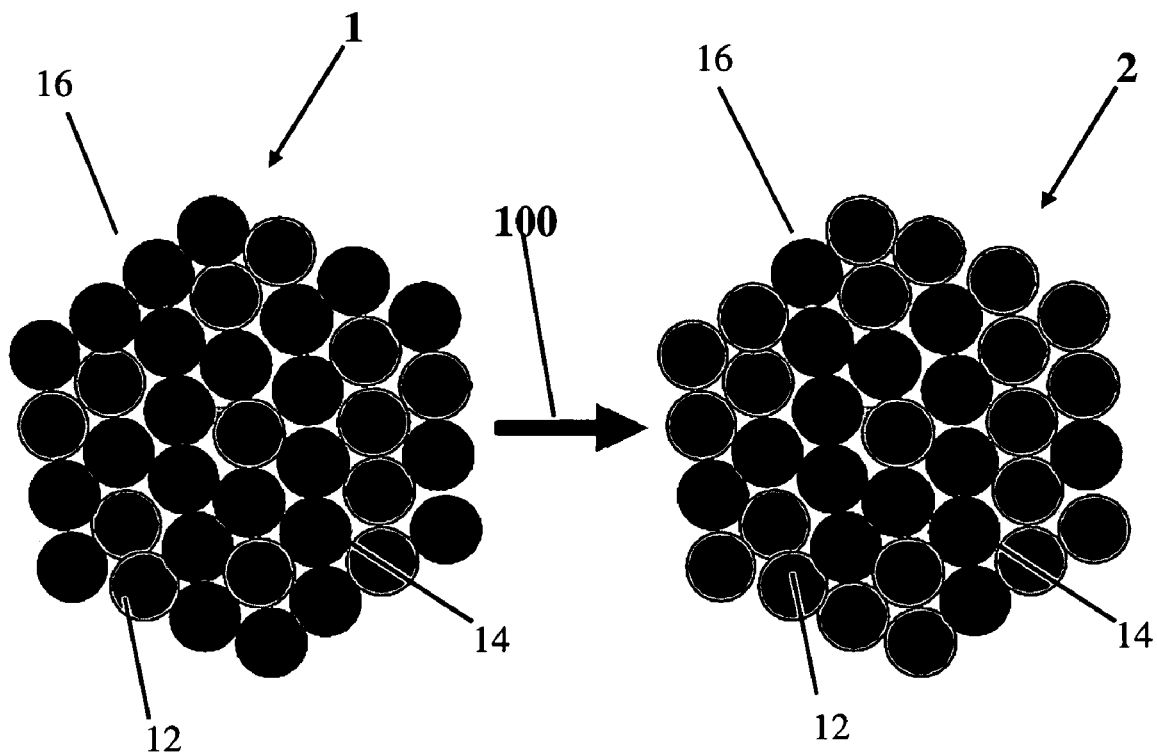
FIG. 1 is a molecular schematic demonstrating the de-alloying of electrocatalytic nanoparticles.

FIG. 1 illustrates a conceptual schematic of the de-alloying method 100 for electrocatalytic nanoparticles 1. The nanoparticles 1 are comprised of Platinum 12, Copper 14, and Cobalt 16 and alloys thereof. Platinum (Pt) 12 is a noble metal and Copper (Cu) 14 and Cobalt (Co) 16 are base metals as used herein. In certain embodiments, the nanoparticles 1, 2 may comprise a trimetallic, or ternary, alloy. Nanoparticles 1 comprise Pt:Cu:Co alloys in atomic ratios by percent (hereinafter atomic ratios) of about 20:40:40; preferably the Pt:Cu:Co atomic ratios are about 20:20:60; and more preferably the Pt:Cu:Co atomic ratios are about 20:60:20. The alloy atomic ratios of the trimetallic, or ternary, nanoparticles are intended to be exemplary and are not interpreted to be limiting to the scope of the disclosure.

Alternatively, the nanoparticles 1 may comprise Pt:Cu alloy nanoparticles, bimetallic or binary, alloy nanoparticle. In certain embodiments, the Pt:Cu alloy nanoparticles 1 comprise atomic ratios by percent (hereinafter atomic ratios) of about 25:75, the Pt:Cu atomic ratio is about 50:50, preferably the atomic ration is about 60:40, more preferably the Pt:Cu atomic ratio is about 75:25, or higher such as about 80:20. The atomic ratios of the bimetallic nanoparticles are only exemplary, and are not interpreted to be limiting to the scope of the disclosure.

It can be envisioned by one skilled in the art that fluctuations the atomic ratios of alloys may be altered, to achieve the same result as understood by one skilled in the art. Furthermore, additional metallic atoms, and/or alloys may be incorporated into the nanoparticles without limitation. Suitable metallic atoms and/or alloys include, without limitation, gold, silver, nickel, palladium, chromium, molybdenum, manganese, titanium, scandium, tungsten, vanadium, or combinations thereof. Further metals may be incorporated into the nanoparticle may be found in Group IIB, Group IB, Group VIII, Group VIIB, and combinations or alloys thereof.

After the nanoparticles 1 are subject to the de-alloying method 100, a de-alloyed nanoparticle 2 remains. The de-alloyed nanoparticle comprises a nanoparticle with an increased Pt 12 to base metal, Cu 14 and Co 16, ratio. Alternatively, de-alloying method 100 has reduced the base metal composition in the de-alloyed nanoparticle 2. The de-alloyed nanoparticle 2 preferably loses base metals Cu 14 and Co 16, compared to the surface of the nanoparticle 1. In certain instances, this may be a core-shell arrangement, alternatively a platinum shell arrangement, a nano-porous particle or further a thin shell arrangement.

Nanoparticle Synthesis

In embodiments, the Pt—Cu—Co catalysts are synthesized by a precursor impregnation method. The Cu—Co precursor solution is created by the dissolution of $Cu(NO_3)_2 \cdot 6H_2O$ and $Co(NO_3)_2 \cdot 6H_2O$ in a solvent. In certain embodiments, the solvent is a polar solvent; for example, the solvent is de-ionized water. Alternatively, the solvent may be any known to one skilled in the art. The Cu—Co precursor solution is admixed with a weighed amount of Pt supported by high surface area carbon. In embodiments the carbon supported Pt has a concentration by weight percent (wt %) between about 10 wt % and about 80 wt %, in preferred embodiments the Pt wt % between about 10 wt % and about 50 wt %, and in most preferred embodiments the Pt wt % between about 18 wt % and about 22 wt %.

The carbon supported Pt/Cu—Co precursor solution is ultrasonicated for between about 30 seconds and about 10 minutes, in other embodiments the solution is ultrasonicated between about 30 seconds and about 2 minutes, and in exemplary embodiments the carbon supported Pt and Cu—Co precursor solution is ultrasonicated for about 1 minute. Alternatively, the carbon supported Pt and Cu—Co precursor solution may be sonicated until thick slurry is formed. The thick slurry is a catalyst synthesis mixture. The catalyst synthesis mixture may be a suspension, a colloid, a solution, or other combination of liquids as known to one skilled in the art.

Alternatively, the Pt—Cu catalysts are synthesized by a precursor impregnation method. The Cu precursor solution is created by the dissolution of $Cu(NO_3)_2 \cdot 6H_2O$ in a solvent. In certain embodiments, the solvent is a polar solvent; for example, the solvent is de-ionized water. Alternatively, the solvent may be any known to one skilled in the art. The Cu precursor solution is admixed with a weighed amount of Pt supported by high surface area carbon. In embodiments the carbon supported Pt has a concentration by weight percent (wt %) between about 10 wt % and about 80 wt %, in preferred embodiments the Pt wt % between about 10 wt % and about 50 wt %, and in most preferred embodiments the Pt wt % between about 18 wt % and about 22 wt %.

The carbon supported Pt/Cu precursor solution is ultrasonicated for between about 30 seconds and about 10 minutes, in other embodiments, the solution is ultrasonicated between about 30 seconds and about 2 minutes, and in exemplary embodiments the carbon supported Pt and Cu—Co precursor solution is ultrasonicated for about 1 minute. Alternatively, the carbon supported Pt and Cu precursor solution may be sonicated until thick slurry is formed. The thick slurry is a catalyst synthesis mixture. The catalyst synthesis mixture may be a suspension, a colloid, a solution, or other combination of liquids as known to one skilled in the art.

The catalyst synthesis mixture is frozen in liquid nitrogen for about 2 minutes to about 20 minutes, preferably from about 5 minutes to about 15 minutes, and in certain embodiments for about 15 minutes. Further, the catalyst synthesis mixture is freeze-dried in a vacuum for about 6 hours to about 18 hours, more preferably about 6 hours to about 12 hours. Alternatively, the catalyst synthesis mixture is freeze-dried in a vacuum overnight. In certain embodiments, the catalyst synthesis mixture is freeze-dried at a temperature of about at least about 0° C., preferably at least about −10° C., and most preferably to a temperature of at least about −25° C. After freeze-drying in a vacuum, the catalyst synthesis mixture forms a catalyst powder. Alternatively, the catalyst synthesis mixture may comprise a particulate, a pulverant, a dust, a chalk, or other dispersed dry solid as understood by one skilled in the art. The catalyst powder may comprise a carbon supported Pt/Cu—Co powder.

The catalyst powder is coated over the bottom of an alumina boat. In certain embodiments, the catalyst powder is coated thinly over the bottom of the alumina boat. Alternatively, the catalyst powder is deposited in the alumina boat. The alumina boat may comprise any ceramic, or alumina structure suitable for retaining liquids, solids, solutions and the like without limitation. The alumina boat comprises any shape such as, but not limited to, rectangular, circular, square, triangular, or polygonal, without limitation. The alumina boat further comprises a lid. In certain instances, the lid partially covers the boat.

The alumina boat containing the freeze-dried catalysts synthesis mixture, or catalyst powder, is annealed. The catalyst powder may be annealed at a temperature between about 200° C. and about 1000° C., preferably between about 500° C. and about 1000° C., in exemplary embodiments the catalyst powder is annealed at about 600° C. Alternatively, the catalyst powder is annealed at about 950° C. In certain embodiments, the annealing continues for about 2 hours to about 20 hours, in more preferred embodiments, the annealing continues for about 4 hours to about 14 hours, and in most preferred embodiments, the annealing continues for about 7 hours. The annealing process may be carried out in any apparatus, without limitation configured for maintaining a high temperature, such as, an oven or furnace. Preferably, the annealing is conducted in a flow furnace. After annealing the carbon supported Pt/Cu—Co powder comprises a PtCuCo/C alloy. In certain instances, the PtCuCo alloy comprises a catalyst alloy. Alternatively, after annealing the carbon supported Pt/Cu powder comprises a PtCu/C alloy. The catalyst alloys after annealing further comprise a catalyst precursor.

Catalyst-Coated Membranes

A catalyst ink is prepared by admixing the PtCuCo/C or PtCu/C catalyst precursor and a solvent. The solvent may comprise isopropyl alcohol, propyl alcohol, acetone, or other solvent, without limitation. In certain instances, the solvent comprises isopropyl alcohol. The suspended catalyst precurso is mechanically agitated with a magnetic stirrer. Mechanical agitation is conducted for between about 1 minute and about 10 minutes. Alternatively, mechanical agitation is conducted for any period suitable to disperse the catalyst PtCuCo/C or PtCu/C alloy precursor in the solvent. Further, the catalyst ink is ultrasonicated for between about 30 minutes and about 2 hours, preferably between about 45 minutes, and about 90 minutes, and in exemplary embodiments, the catalyst ink is ultrasonicated for about 1 hour.

In embodiments, NAFION® (sulfonated tetrafluorethylene copolymer), hereinafter copolymer, is admixed with the ultrasonicated catalyst ink. In certain embodiments, the copolymer is added to the catalyst ink after mechanical agitation, during ultrasonication with the solvent, or alternatively, after ultrasonication with the solvent. The inclusion of a sulfonated tetrafluorethylene copolymer, such as NAFION®, is exemplary as disclosed herein. It can be envisioned and understood by one skilled in the art that any suitable copolymer may be utilized. The copolymer/catalyst ink mixture is dispersed by ultrasonicating for between about 30 minutes and about 2 hours, preferably between about 45 minutes and about 90 minutes, and in exemplary embodiments about 1 hour.

The dispersed copolymer/catalyst ink mixture is used to make catalyst-coated membranes, hereinafter CCM. The CCM are used to fabricate membrane electrode assemblies, hereinafter MEA. In an embodiment, the dispersed copolymer/catalyst ink mixture is spray cast between high-density polyethylene sheets. Any suitable spray cast apparatus may be used, without limitation. In some instances, the process of spray casting is controlled via peristaltic pump for precise control of spray, flow rate, or other parameters understood by one skilled in the art. In an embodiment, a plurality of spray cycles may be necessary to achieve catalyst loading in a CCM. The CCMs are dried in a conventional oven at a temperature between about 20° C. and about 90° C., preferably between about 40° C. and about 80° C., and in most preferably at about 80° C.

Membrane Electrode Assembly

Figure 2:
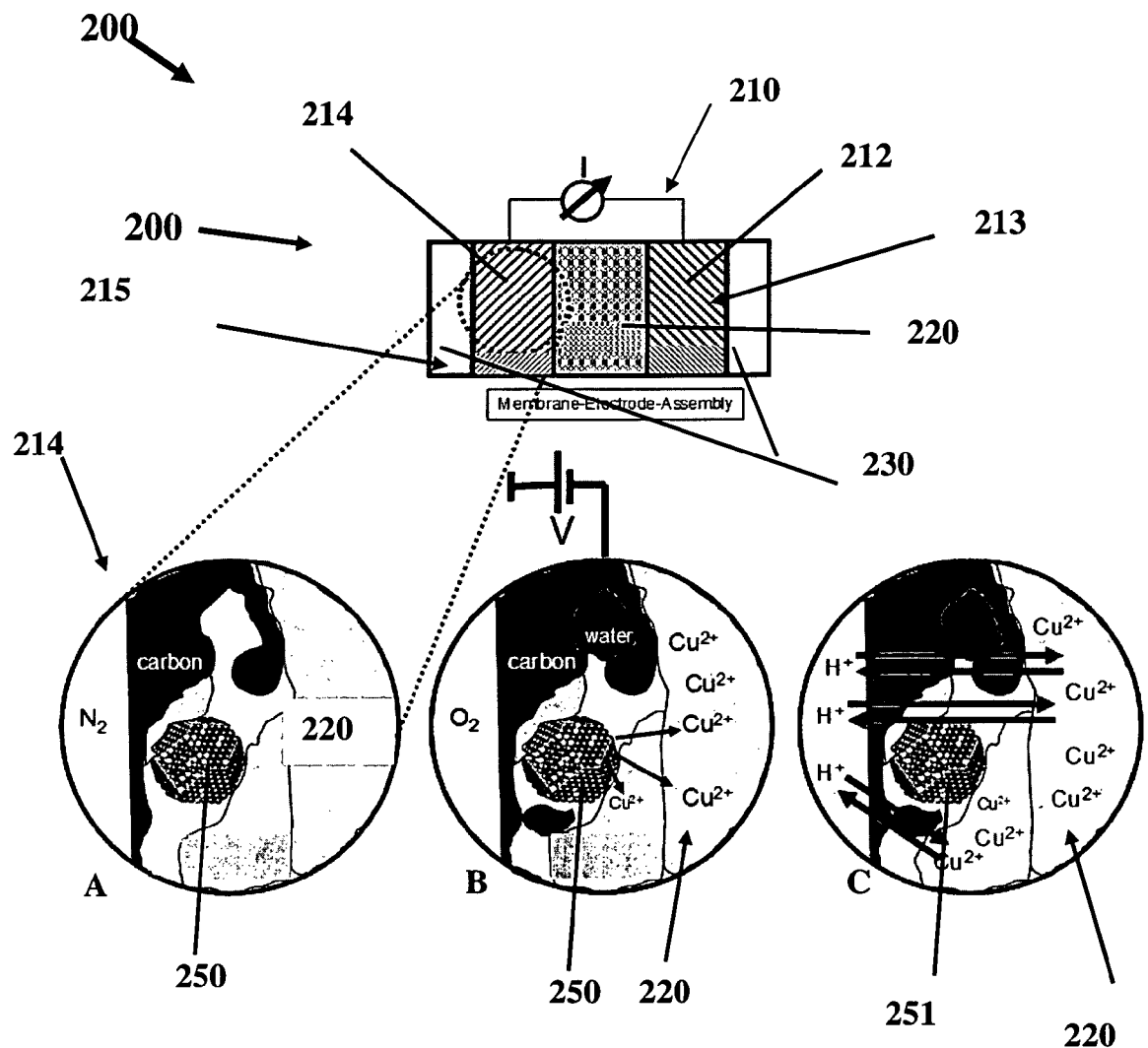
FIG. 2 illustrates the method for de-alloying base metal rich nanoparticle catalysts.

FIG. 2 illustrates a schematic of an embodiment of a three-step method 200 for creating de-alloyed electrocatalyst nanoparticles in situ in a membrane electrode assembly (MEA) 210. The MEA 210 may be de-alloyed in an electrochemical cell, for example a fuel cell 205. In the embodiment illustrated, the alloy nanoparticles 220 in catalyst-coated membranes (CCM) 212 are incorporated into the MEA 210. In certain embodiments, the CCM 212 is the anode; in preferred embodiments, CCM 212 is the cathode. After MEA 210 preparation for a fuel cell comprises membrane 220, anode 212, with anode gas diffusion membrane 213, hereinafter anode GDM, and cathode 214, with cathode gas diffusion membrane 215, hereinafter cathode GDM. In embodiments, the GDM 213, 215 may comprise any suitable material known to one skilled in the art.

The temperature of the fuel cell 205 is maintained at about 20° C. and about 90° C., preferably between about 20° C. and about 50° C., in exemplary embodiments the temperature is at about 30° C. In further embodiments, the electrode humidifiers 230 are set at about 20° C. and about 90° C., preferably between about 20° C. and about 50° C., and most preferably at about 50° C. Hydrogen is introduced to the anode 212, and nitrogen is introduced to the cathode 214. Open circuit potential (OCV) is monitored until a stable cyclic voltammetric signal, hereinafter CV, is measured between about 0.01V and about 3.0V, more preferably between about 0.01V and about 2.0V, and most preferably between about 0.05V and about 1.2V.

In embodiments, once a stable OCV is reached, the fuel cell 205 temperature is raised to between about 50° C. and about 90° C., preferably between about 60° C. and about 90° C., and most preferably about 80° C. Additionally, the humidity is raised to 100% relative humidity (RH) in the electrode humidifiers 230. Oxygen is introduced to the cathode 214 to replace the nitrogen. In embodiments, the fuel cell 205 is maintained at about 0.01V and about 3.0V, more preferably between about 0.01V and about 2.0V, and most preferably, at about 0.6V, once a stable OCV is reached. The fuel cell 205 is allowed to hydrate for between about 4 hours and about 9 hours, preferably between about 5 hours and about 7 hours, and in exemplary embodiments about 6 hours. The temperature of the fuel cell 205 is returned to its initial starting temperature between about 20° C. and about 90° C., preferably between about 20° C. and about 50° C., in exemplary embodiments the temperature is at about 30° C. In further embodiments, the electrode humidifiers 230 are set to between about 20° C. and about 90° C., preferably between about 20° C. and about 50° C., and most preferably at about 50° C.

Nitrogen is introduced to the cathode until a stable OCV is reached. In embodiments, a stable OCV at this time represents the initiation of electrochemical de-alloying as illustrated in FIG. 2 part B. In embodiments, the electrochemical de-alloying comprises the starting of the active phase of the nanoparticle catalysts 250 formed during the de-alloying process to create de-alloyed catalyst 251. During this time, the potential is repeatedly cycled between about 0.01V and about 3.0V, more preferably between about 0.01V and about 2.0V, and most preferably between about 0.5V and about 1.0V. The cycle is repeated between about 100 and 500 cycles, preferably between about 200 and 400 cycles, and most preferably between about 200 and 300 cycles. In embodiments, cycling the potential is completed when the hydrogen desorption peak on a CV graph becomes approximately similar to that of a pure Pt graph. In certain instances, the similarity of the CV graph represents the absence of copper, cobalt or other metal atoms from the surface of the nanoparticles.

As illustrated in FIG. 2 part C, the fuel cell 205 is disassembled so that the MEA 210 is removed and soaked in acid for between about 30 minutes and about 2 hours, preferably between about 45 minutes and about 90 minutes, and in exemplary embodiments about 1 hr. This process is repeated at least one time. In certain instances, the acid is sulfuric acid. The sulfuric acid has a concentration of between about 0.25 M and 2 M, preferably between about 0.5M and about 1.5 M, and more preferably about 1 M. In alternative embodiments the acid may be any strong hydrogen donating acid, such as, with out limitation, acetic, hydrochloric, nitric acid, perchloric acid, hydro-bromic acid, hydro-iodic acid or combinations thereof. After acid treatment the MEA 210 may be considered activated, alternatively the de-alloyed catalyst may comprise an activated catalyst.

Chemical De-Alloying

In certain instances, it may be possible to de-alloy the nanoparticle catalysts chemically without forming a membrane electrode assembly or electrochemical cell. Chemical de-alloying may further comprise ex-situ de-alloying. In chemical de-alloying embodiments, the catalyst precursor or catalyst alloy is treated with strong acid, alternatively a mineral acid. In embodiments, the strong acid comprises any strong hydrogen donating acid, such as, without limitation, acetic, hydrochloric, nitric acid, perchloric acid, hydro-bromic acid, hydro-iodic acid or combinations thereof. In certain instances, the acid is sulfuric acid. The sulfuric acid has a concentration of between about 0.25 M and 2 M, preferably between about 0.5M and about 1.5 M, and more preferably about 1 M. The catalyst precursors are treated for between about 6 hours and about 48 hours, preferably between about 8 hours and 36 hours, and in exemplary embodiments between about 12 hours and about 24 hours.

After acid treatment, the acid precursors are activated catalysts. The activated catalysts may be washed. In embodiments, the wash comprises a first solvent, such as but not limited to an alcohol, a polar solvent, an aqueous solvent, a base, or other appropriate solvent for washing acid as known to one skilled in the art. Preferably, the first solvent comprises de-ionized water. The activated catalysts may be suspended in a second solvent. In certain instances, the second solvent also comprises de-ionized water. The second solvent may comprise a paste, a gel, or viscous suspension. In embodiments, the activated catalysts may be used to form a membrane electrode assembly.

To further illustrate various embodiments of the present invention, the following examples are provided.

EXAMPLES

Summary of Experimental Process

Alloy precursors with Pt:Cu:Co stoichiometries of about 20:60:20, 20:20:60 and 20:40:40 respectively, were prepared from carbon supported 30 wt % Pt nanoparticles (30% by weight) mixed with Cu and Co salt solutions via an impregnation, freeze-drying, reductive-annealing method. Rotating disk electrode (RDE) activity measurements were performed in a three-electrode configuration on a 5 mm Glassy Carbon disk electrode in 0.1 m $HClO_4$ electrolyte. Fuel Cell measurements were carried out using 10 $cm^2$ catalyzed area cells, commercial NAFION® membranes (NRE 212), 40 wt % Pt/C anode catalysts (0.4 mg Pt/$cm^2$) and the ternary alloy precursor employed as cathodes. Voltammetric de-alloying was performed at room temperature by cycling the cathode potential between 0.5 and 1 V/RHE under nitrogen flow. Ion exchange was performed using 1 M Sulphuric acid at 80° C. for 1 hr.

Preparation of the Catalysts

PtCuCo alloy catalysts were synthesized via a liquid precursor impregnation method. Cu, Co precursor solutions were prepared by dissolving appropriate amount of Cu $(NO_3)_2.6H_2O$ and $Co(NO_3)_2.6H_2O$(ACS reagent, Sigma Aldrich) in de-ionized water (>18.2MΩ, MILLI-Q® gradient system, Millipore Inc.). The precursor solutions were then added to weighted amount of commercially viable high surface area carbon supported Pt (30% Pt by weight). The mixtures were ultrasonicated for 1 min (Branson Sonifier 150) until thick slurries were formed. The catalyst synthesis mixture was subsequently frozen in liquid nitrogen for 15 min, and then freeze-dried in vacuum (50 mTorr) overnight until the temperature of the samples reached −25° C. The resulting powder was loaded as a thin powder film on the bottom of a rectangular alumina boat (50 mL) with a partially covering lid. The powders were then annealed to a maximum temperature of 600° C. for 7 h (10 K/min heating rate) in a flow furnace (Lindberg Blue) under a flowing 4% hydrogen atmosphere (Ar balance). The PtCuCo/C samples were then stored in NALGENE® desiccators with continuous flow of $N_2$ through the desiccator for future use.

Carbon supported Pt—Cu alloy nanoparticle electrocatalysts of stoichiometries $Pt_{25}Cu_{75}$, $Pt_{50}Cu_{50}$, and $Pt_{75}Cu_{25}$ were synthesized via a liquid salt precursor impregnation method reported earlier. Measured amounts of a Cu nitrate $(Cu(NO_3)_2.3H_2O$, Aldrich) were dissolved in de-ionized water (18.2 MΩ, Milli-Q® gradient system, Millipore Inc.). The precursor solutions were then added to a weighted amount of commercial carbon-supported Pt nanoparticle electrocatalyst (Tanaka Kikinzoku Inc.) with a Pt weight loading of about 30 wt %. The mixtures were then ultrasonicated with a sonifier horn (Branson 150, level 2) for 1 min and then frozen in liquid nitrogen for 5 min. Subsequently, the frozen samples were freeze-dried (Labconco) for 24 h and annealed in flowing hydrogen/Argon mixtures in a flow furnace (Lindberg Blue) to a temperature of 600° C. and 950° C. The annealed precursor powders were stored in NALGENE® desiccators, with continuous nitrogen gas flow, for future use. The resulting Pt loadings of the Pt—Cu catalysts ranged from 22 wt % to about 30 wt %.

Catalyst Characterization by X-Ray Diffraction (XRD)

XRD analysis of the electrocatalysts was performed by a Siemens D5000 (θ/2θ) diffractometer equipped with a Braun Position Sensitive Detector (PSD) with an angular range of 8°. The Cu Kα source was operating at a potential of 35 kV and a current of 30 mA. 2θ diffraction angles ranged from 21 deg to 70 deg, using step scans of 0.02 deg/step and a holding time of 10 s per step. Advanced X-ray Solution (X-ray commander, Bruker AXS) software was used to control the diffractometer with a desktop computer. XRD patterns were analyzed by JADE 8.1 software (MDI): Peak profiles of individual reflections were obtained by a non-linear least-square fit of the Cu $Kα_2$ corrected data.

The XRD sample holder was a custom made 9 $cm^2$ (3 cm×3 cm) polycarbonate sheet with a 1 cm by 2 cm by 1 mm deep well in the center that hold the powder catalyst samples. The catalyst powder was poured into the well and carefully flattened to form a smooth surface, flush with the surface of the polycarbonate.

Figure 4:
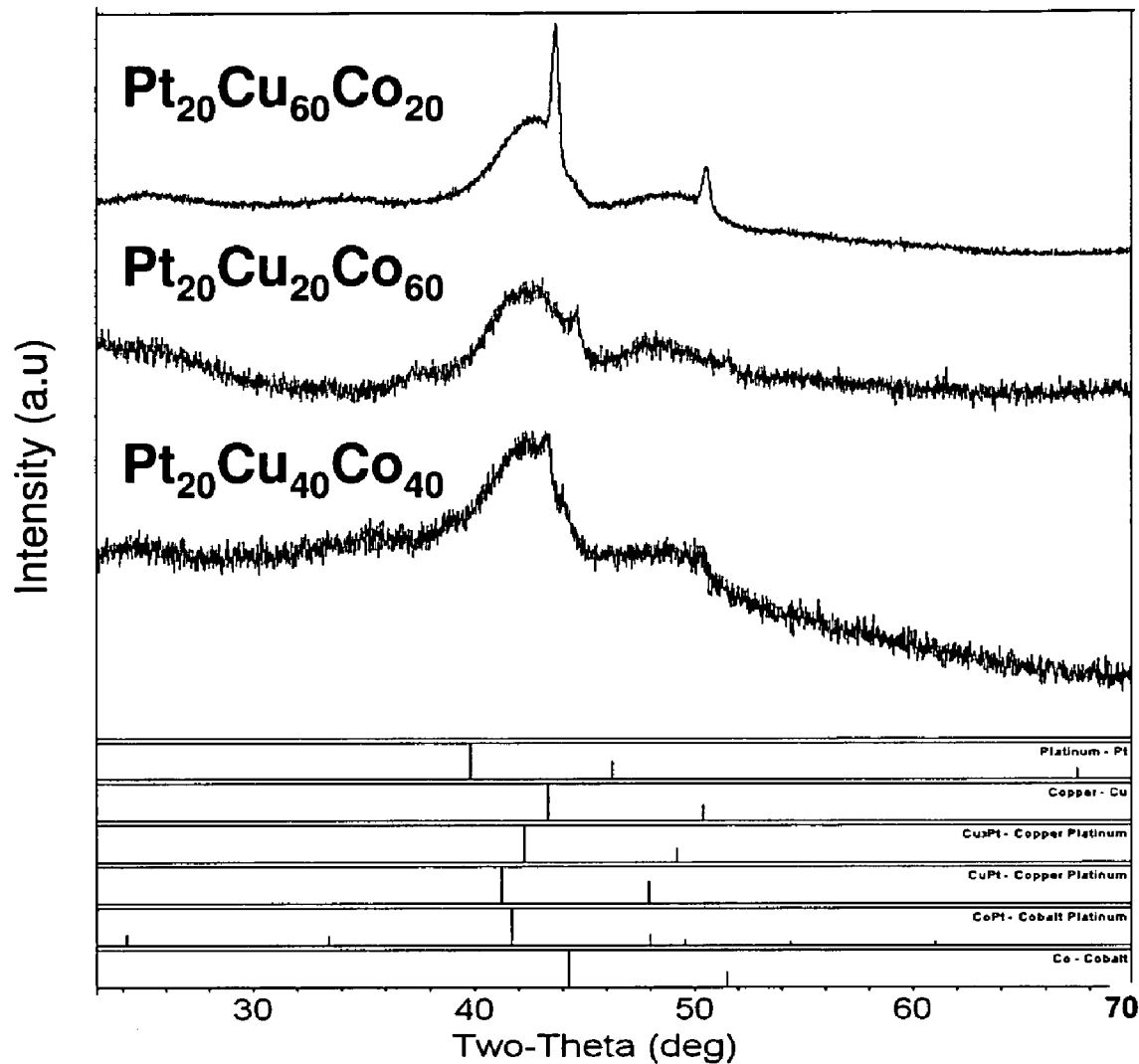
FIG. 4 illustrates X-Ray diffraction profiles of Pt:Cu:Co nanoparticle alloy precursors.

Structural X-ray diffraction analysis was consistent with our voltammetric de-alloying study. FIG. 4 shows all three alloy-particle catalysts showed face-centered cubic (fcc) disordered alloy structures with the (111) reflection shifted to higher 2$q$ values compared to pure Pt. Residual unalloyed Cu ($Pt_{20}Cu_{60}CO_{20}$ and $Pt_{20}C_{50}CO_{40}$) and Co particles ($Pt_{20}Cu_{20}CO_{60}$) with large size showed sharp characteristic reflections.

Rotating Disk Electrode (RDE) Film Preparation

Prior to electrode preparation, a 5 mm diameter glassy carbon Rotating Disk Electrode (RDE) was polished to a mirror finish using 0.5 and 0.05 μm alumina suspension (Buehler Inc.) A catalyst ink was prepared by mixing measured amount of the alloy precursor catalysts in 20 ml of an aqueous solution containing 5 wt % NAFION® solution (Sigma, #274704) and ultrasonicated for 15 min. A 10 μl aliquot was dispensed onto the Rotating Disk electrode resulting in a typically Pt loading of about 14 μg Pt/$cm^2$ geometric surface area. The ink was then dried for 10 min in air.

Electrochemical Characterization Using RDE

The electrochemical RDE cell was a custom-made, three-compartment cell. The working electrode was a commercial glassy carbon rotating disk electrode of 5 mm fixed diameter. The reference electrode was a mercury-mercury sulphate electrode. All electrode potentials were subsequently converted into, and are reported with respect to, the reversible hydrogen electrode (RHE) scale. The counter electrode was a piece of platinum gauze to ensure large surface area. A commercial rotator from Pine Instrument was used to conduct the rotating disk experiment. The electrolyte used was 0.1 M $HClO_4$, prepared by diluting 70% redistilled $HClO_4$ (Sigma #311421) with de-ionized water. The disk potential was controlled with a potentiostat, BiStat (Princeton Applied Research, Ametek). All measurements were conducted at room temperature. At the beginning of electrochemical measurements, electrocatalysts were immersed into the electrolyte under potential control and held at 0.06 V/RHE until the measurements commenced. Cyclic voltammetric (CV) measurements were conducted in de-aerated electrolyte, under $N_2$ atmosphere. The initial three cyclic voltammograms were recorded between 0.06V and 1.2 V at 100 mV/s in order to monitor the early stage of the de-alloying process. Then, the electrocatalysts were pretreated using 200 fast CV scans between 0.06V and 1.2 V at a scan rate of 1000 mV/s. Thereafter, the potential was again scanned at 100 mV/s from 0.06 V to 1.2 V and back to 0.06 V in order to determine the platinum electrochemical surface area (Pt-ECSA). The Pt-ECSA of the catalyst was determined from the mean integral charge of the hydrogen adsorption and desorption areas after double-layer correction, using 210 $\mu C\ cm^2_{Pt}$ as the conversion factor.

Linear sweep voltammetry (LSV) measurements were conducted by sweeping the potential from 0.06 V anodically to the open circuit potential (around 1.0 V) at the scan rate of 5 mV/s. Mass and specific activities were established at 900 mV/[RHE], at room temperature. The electrochemical behavior (CV and LSV) of the Pt—Cu catalysts was compared to a 30 wt % reference platinum electrocatalyst supported on a high surface area carbon support.

MEA Fabrication

Catalyst ink was prepared by initially blending the Pt/C or Pt—Cu—Co/C cathode catalyst with cold isopropyl alcohol (HPLC grade, Sigma Aldrich) with a magnetic stirrer. Then it is sonically dispersed (Model 75D, VWR) for 1 h. Appropriate amount of 5 wt % 1100 eq. wt NAFION® was added to the dispersed catalyst for H+ conduction and binding of the catalyst particles in the catalytic layer and with a membrane. This mixture is again sonicated for 1 h. Catalyst coated membranes (CCMs) were prepared by a robotic spray machine (PVA Inc.). Precise control of the catalyst ink flow to the atomizing nozzle was fetched by a peristaltic pump (MASTERFLEX®, Cole-Parmer Inc.) NAFION® NRE212 (dispersion cast membrane) was supported by placing the membrane between two high density polyethylene sheet with a desired window size on the sheets for catalyst coating which is then clamped together and kept in the spray pattern area. Several spray pattern cycles was repeated for desired catalyst loading before drying the CCM/MEA in a conventional oven at 80° C.

Electrochemical De-Alloying

A separate 10 $cm^2$ fuel cell assembly has been separated for in-situ electrochemical dealloying, since base metal dissolution contaminates the flow fields. We have used stainless steel bottles and diverted the outlet vent lines from PEMFC into the bottles to collect contaminated water (base metal dissolved). After MEA preparation, the cell is assembled with a GDM (SGL Carbon Inc.) and gasket (TEFLON®). The completion of Step 1 of the MEA dealloying procedure is illustrated in FIG. 2 part A. Cell temperature is fixed at 30° C., cathode and anode humidifier are kept at 50° C. Hydrogen is fed onto the anode side and nitrogen on the cathode side, when the OCV (Open circuit potential) becomes stable a CV is measured using potentiostat (GAMRY Reference 600) between 0.05V and 1.2V, with a scan rate of 20 mV/sec. This CV is taken to depict that as the MEA is prepared with a higher base metal content, no clear hydrogen desorption peak is observed.

Now the cell temperature is increased to 80° C. with humidifiers at 100% RH. Oxygen is fed onto the cathode side, and when stable OCV is reached, the cell is put into the potentiostatic mode at a constant voltage of 0.6 V. The cell is allowed to hydrate for 4 hours, after which the cell temperature is brought down to 30° C., and cathode and anode at 50° C. Again, nitrogen is fed onto the cathode side. When stable OCV is reached, process of electrochemical de-alloying is begun, where the potential is cycled between 0.5V-1.0V repeatedly (about 200-300 times) until the hydrogen desorption peak has become time stable and similar to a pure Pt catalyst completion of STEP 2 of the MEA de-alloying procedure illustrated in FIG. 2 part B.

The cell is now dissembled and the metal ion containing MEA is removed and soaked in 1 M sulfuric acid at 80° C. for 1 hr, followed by washing with DI water. This process is again repeated once more in order to remove any $SO_4^{-2}$ ions presence, which is the completion of STEP 3 of the MEA de-alloying procedure illustrated in FIG. 2, part C. The MEA is further dried in an oven at 80° C. overnight.

Chemical De-Alloying

In chemical de-alloying, the precursor powders were treated with 1 M H2SO4 at 80° C. for 36 h and then washed several times with deionized water. Finally the Cuion-free catalyst was frozen in liquid N2 and vacuum-dried over night. The dealloyed catalyst powder was then used to prepare the cathode layer. In electrochemical dealloying, the precursor material was used to prepare the catalyst paste which was applied as the cathode layer of an MEA.

MEA Characterization and Performance Evaluation

To accurately measure the activation polarization of the catalyst, it is essential to determine H2 crossover current in the fuel cell determined by linear sweep voltammetry (LSV) by sweeping the potential from 0.05V to 0.6V (20 mV/s) at same temperature and pressure after iV recording. At >0.4V the resulting hydrogen oxidation current is purely limited by H2 permeation (crossover) rate. The H2 anode served as a counter & reference, while the N2 purged cathode is the working electrode with gas flow of $H_2/N_2$=160 mL/min. All the voltages reported here are in RHE scale.

Electrochemical Surface Area Characterization

Pt surface area was determined by cyclic voltammogram, the anode and cathode side of the cell is fed with H2 and N2. The cell temperature was brought to 30° C., and humidifiers were kept at 50° C. at atmospheric pressure. Cyclic voltammogram were performed between 0.05-1.2 V at a scan rate of 20 mV/s, the area of $H_2$ adsorption peak between 0.05-0.4 V was calculated after double layer correction.

Figure 3:
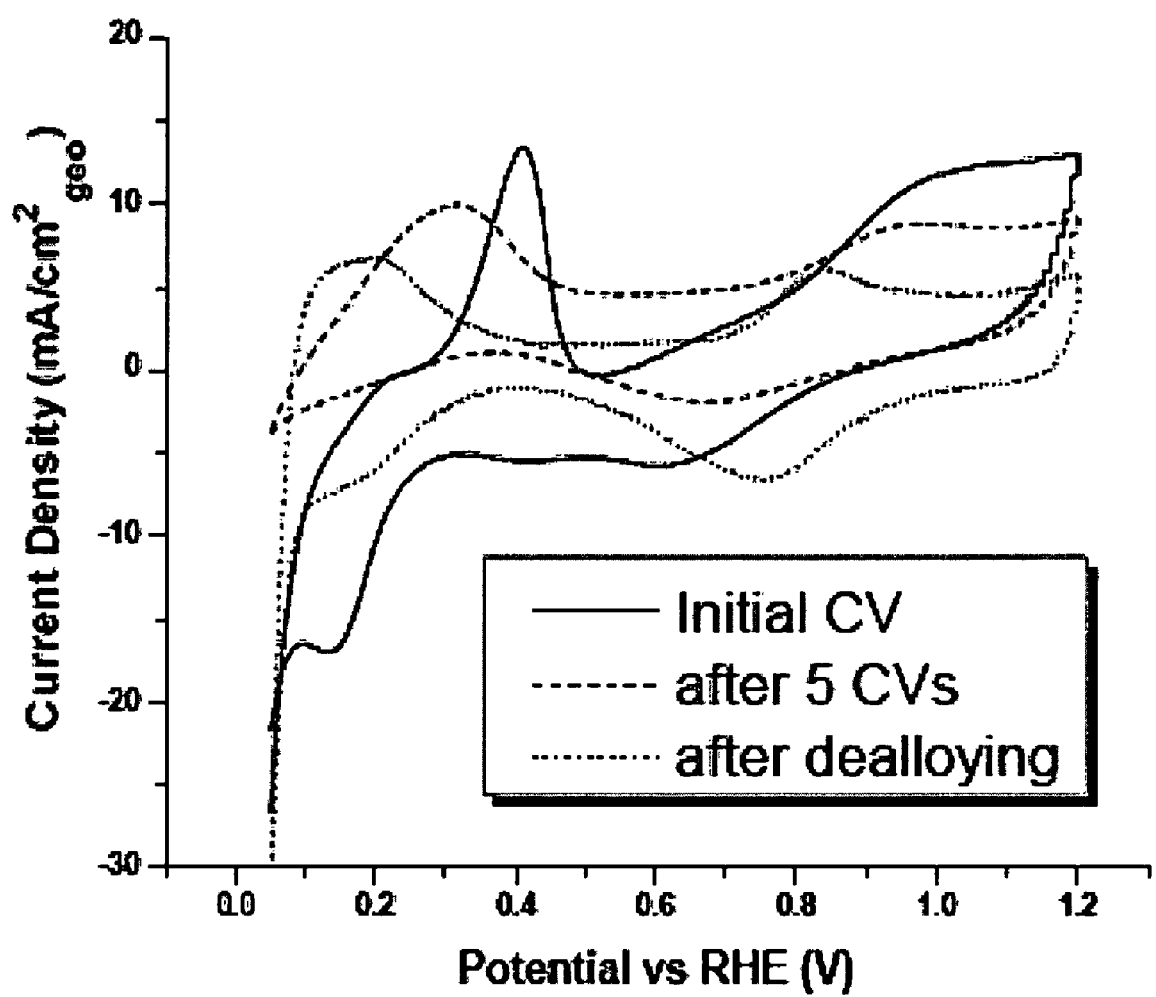
FIG. 3 illustrates oxygen reduction reaction (ORR) activity curves in a rotating disk electrode.

To analyze the early stages of the Cu de-alloying process inside a fuel-cell membrane-electrode assembly, we studied the system by cyclic voltammetry, as illustrated in FIG. 3. The initial trace, shown by the solid line, showed strong bulk Cu dissolution on the anodic scan between 0.3 and 0.5 V as well as some Cu re-deposition, 0.05-0.3 V, on the return scan. This result is consistent with the fact that much Cu had segregated to the Pt—Cu alloy surface of the annealed precursor particles. After five scans, the response of the de-alloyed catalyst started to resemble that of a Pt-rich catalyst surface with hydrogen adsorption and desorption emerging in the 0.05-0.4 V region and in the platinum oxide formation region above 0.7 V, shown by the dashed line. After de-alloying over about 250 cycles, shown by the dotted line, the resulting voltammogram resembles that of pure Pt, thus supporting our hypothesis that the de-alloying process results in a stable catalyst with an essentially pure Pt surface.

Figure 5:
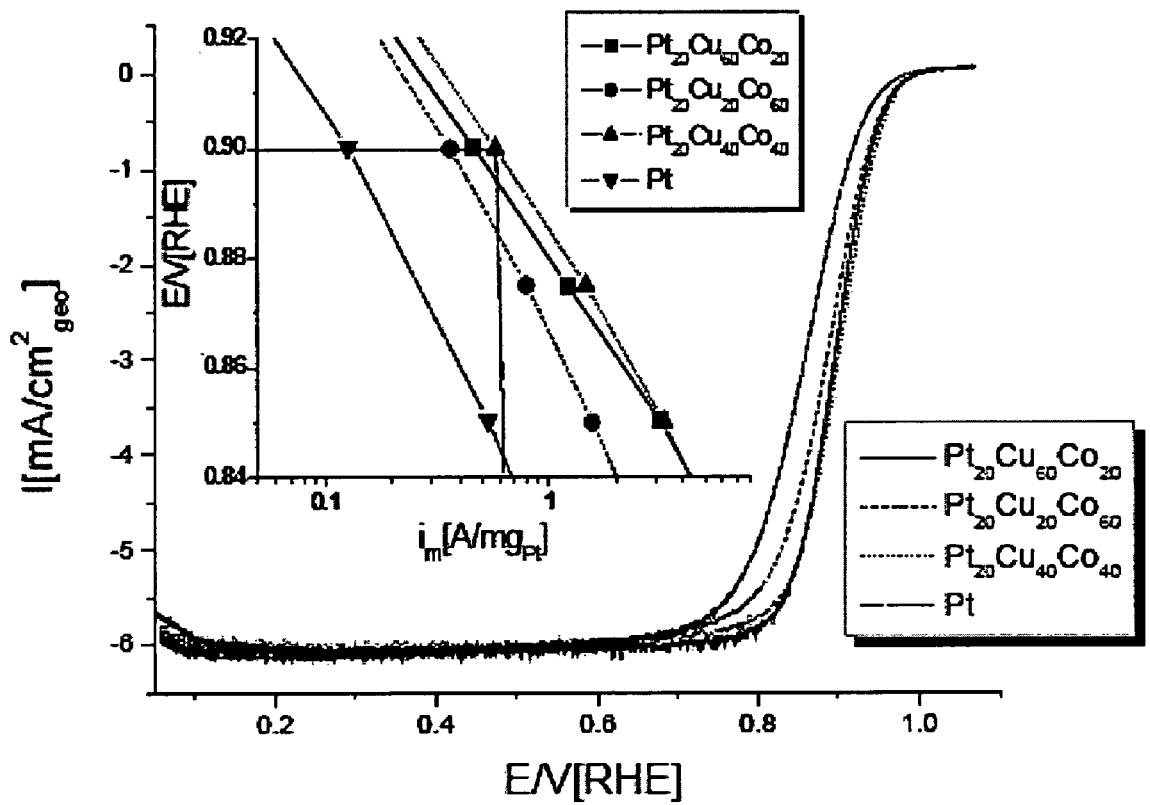
FIG. 5 illustrates a sequential voltammogram plot during de-alloying.

FIG. 5 shows the oxygen reduction reaction (ORR) activity during sweep voltammetry of the three trimetallic, or ternary, catalysts. The sigmoidal shape of the ORR current-voltage characteristic is shifted toward positive potentials, indicating ORR activity at much lower over-potentials. Comparison of their Pt-surface-area-based activities and their Pt-mass-based activities, in the inset, with pure Pt revealed an unprecedented four- to fivefold improvement over a wide potential range. For instance, de-alloyed $Pt_{20}Cu_{40}CO_{40}$ exhibited 0.6 $A/mg_{Pt}$ compared to 0.12 $A/mg_{Pt}$ for pure Pt.

Figure 6:
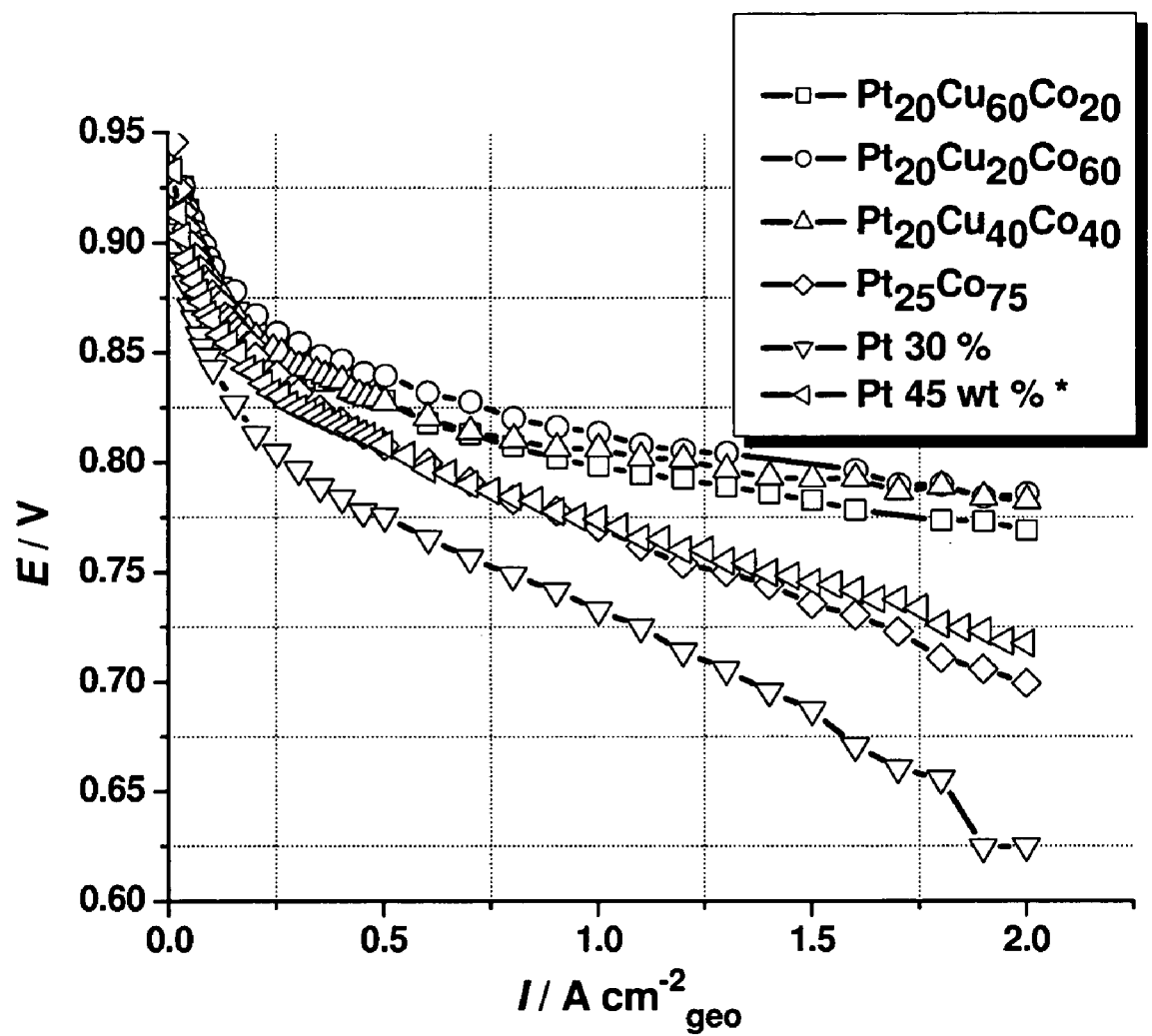
FIG. 6 illustrates the polarization curves of fuel cells using de-alloyed nanoparticles electrocatalysts.
Figure 7:
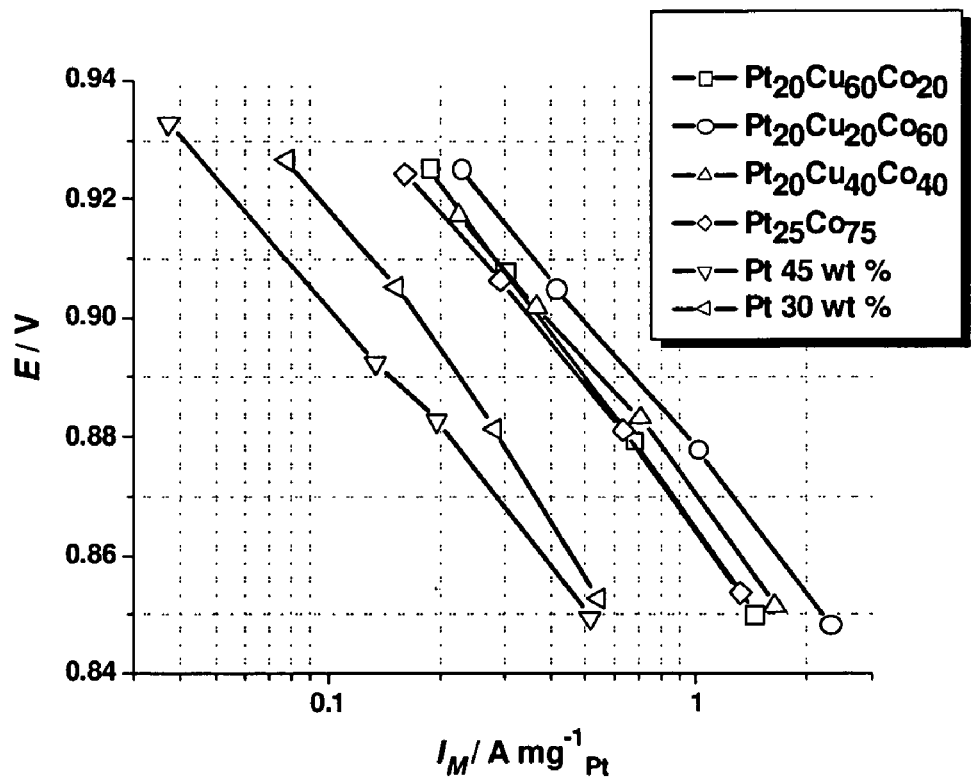
FIG. 7a shows a graphical illustration of an ORR activity curve compared to the Pt mass based activity.
FIG. 7b illustrates a graph of an ORR curve compared to Pt surface area based activity.
Figure 7:
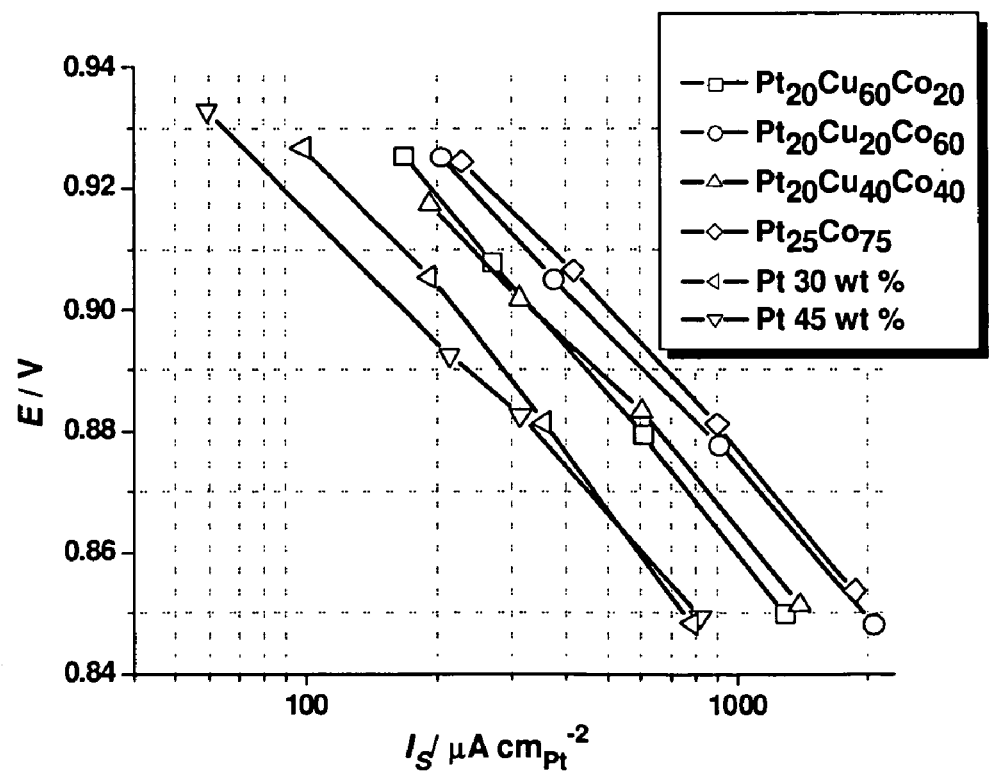

The cell performance and the catalytic ORR activity of the carbon supported de-alloyed catalysts (20-28 wt % Pt loading) in fuel-cell environments benchmarked against a carbon-supported 30 wt % and a 45 wt % Pt standard as illustrated in FIGS. 6 and 7. The 45 wt % catalyst is commonly used as the Pt standard cathode electrocatalyst. We also compared our ternary catalysts to a $Pt_{25}CO_{75}$ catalyst to show the synergies between Co and Cu. All three ternary alloy catalysts exhibited much higher cell potentials as shown in FIG. 6 over the entire range of current densities. The high-current region, in which gas and proton transport determines the overall current, gives evidence that the de-alloying procedure had no detrimental effect on the transport characteristics of the fuel-cell electrodes or membrane.

Figure 8:
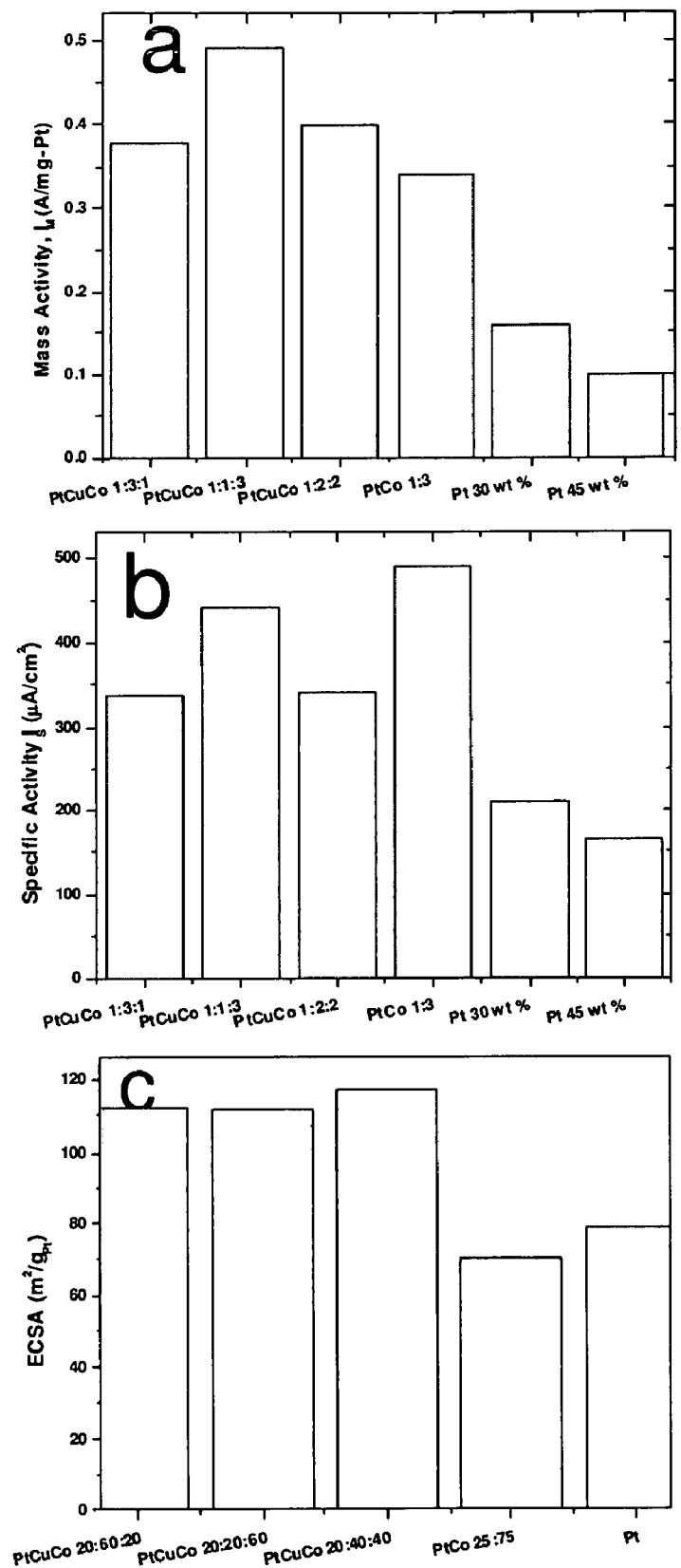
FIG. 8a shows a graphical analysis of mass activities at 0.9V cell potential
FIG. 8b shows a graphical comparison of surface area activities at 0.9V
FIG. 8c illustrates an electrochemical surface areas (ECSA) analysis.

Detailed catalytic ORR activities on a Pt-surface-area and Pt-mass basis are reported in FIG. 8 and in Table 1, below. All de-alloyed base-metal-rich catalysts exhibit previously unachieved four- to five fold Pt-mass-based activity improvements over Pt. FIG. 8 further illustrates the significant activity improvement of about 50% at 0.9 V caused by adding Cu to a $Pt_{25}CO_{75}$ catalyst.

The electrochemical surface-area data of the alloy catalysts, shown Table 1 and FIG. 8c, demonstrate that the de-alloying process resulted in an almost twofold increase in active-particle surface area compared to the 45 wt % standard catalyst. This increase might be caused by surface roughening or particle break-up during dissolution. While contributing to the improved activity, the surface-area change fails to account for the observed four to five-fold activity gains. More favorable structural characteristics, such as Pt—Pt surface interatomic distances of the de-alloyed particles, may play a key role in the enhancement mechanism.

TABLE 1

| Pt | Cu | Co | Cathode Pt loading [$mg_{Pt}cm^{-2}$] | ECSA [$m^2g^{-1}$] | Mass activity [$A\ mg_{Pt}^{-1}$] | Specific activity [$\mu A\ cm_{Pt}^{-2}$] |
|---|---|---|---|---|---|---|
| 20 | 60 | 20 | 0.183 | 112 | 0.37 | 337 |
| 20 | 40 | 40 | 0.150 | 117 | 0.39 | 340 |
| 20 | 20 | 60 | 0.150 | 111 | 0.49 | 441 |
| 25 | 0 | 75 | 0.146 | 70 | 0.34 | 491 |
| 100 | 0 | 0 | 0.149 | 79 | 0.16[a] | 209 |
| 100 | 0 | 0 | 0.313 | 62 | 0.10[b] | 165 |

[a]30 wt % Pt.
[b]45 wt % Pt.

A structural hypothesis for the de-alloyed catalysts, structural and compositional analysis indicates that the de-alloying procedure removed base metal atoms from the particle surface. The thickness of the de-alloyed region is likely to dependent on the starting stoichiometry, alloy uniformity, and detailed de-alloying conditions. The active or de-alloyed catalyst phase is represented by a core-shell nanoparticle as illustrated in FIG. 1.

Figure 9:
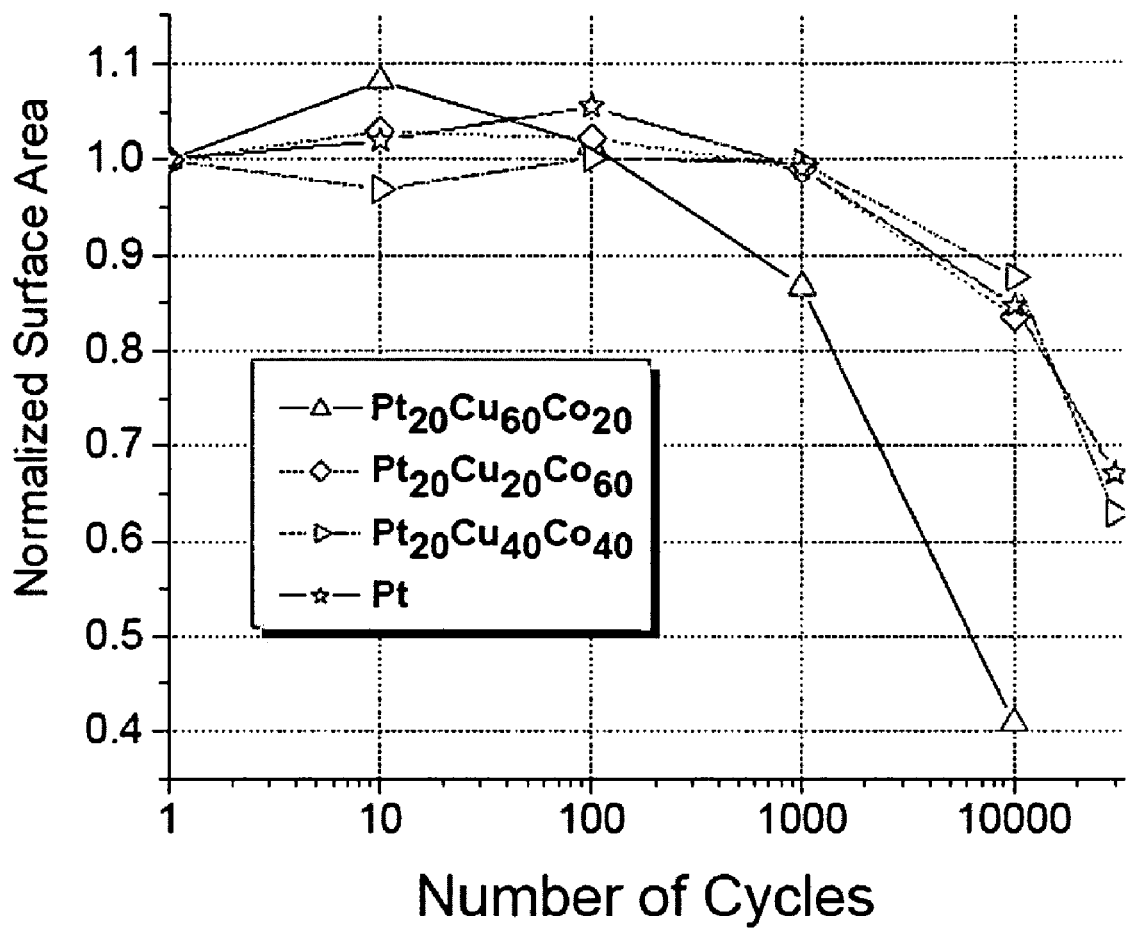
FIG. 9 shows a graphical ECSA loss analysis over potential cycles.

A Pt-enriched shell, with some residual Co atoms, surrounds a base-metal-rich particle core. The distinct structural and electronic characteristics of the alloy core are likely to affect those of the surface Pt layers, thus modifying chemisorption energies and activation barriers of elementary steps of the ORR process. Evaluation of the electrochemical stability of the de-alloyed catalysts by monitoring the changes in electrochemical surface area during voltage cycling is illustrated in FIG. 9. Generally, the surface area of Pt particle catalysts in electrochemical environments decreases significantly owing to Ostwald growth or dissolution. Voltage cycling between 0.5 and 1 V resulted in a relative surface area loss of about 15% after 10,000 cycles and 35% after 30,000 cycles for the $Pt_{20}Cu_{20}CO_{60}$ and $Pt_{20}Cu_{40}CO_{40}$ alloy catalysts. This finding is very similar to the observed losses of pure Pt. Cycling between 0.5 and 1.2 V resulted in a severe decrease in surface area by 60% after 10000 cycles, again in line with Pt stability measurements.

ORR Electrocatalysis of De-Alloyed Pt—Cu Bimetallic Alloy Nanoparticles

Figure 10:
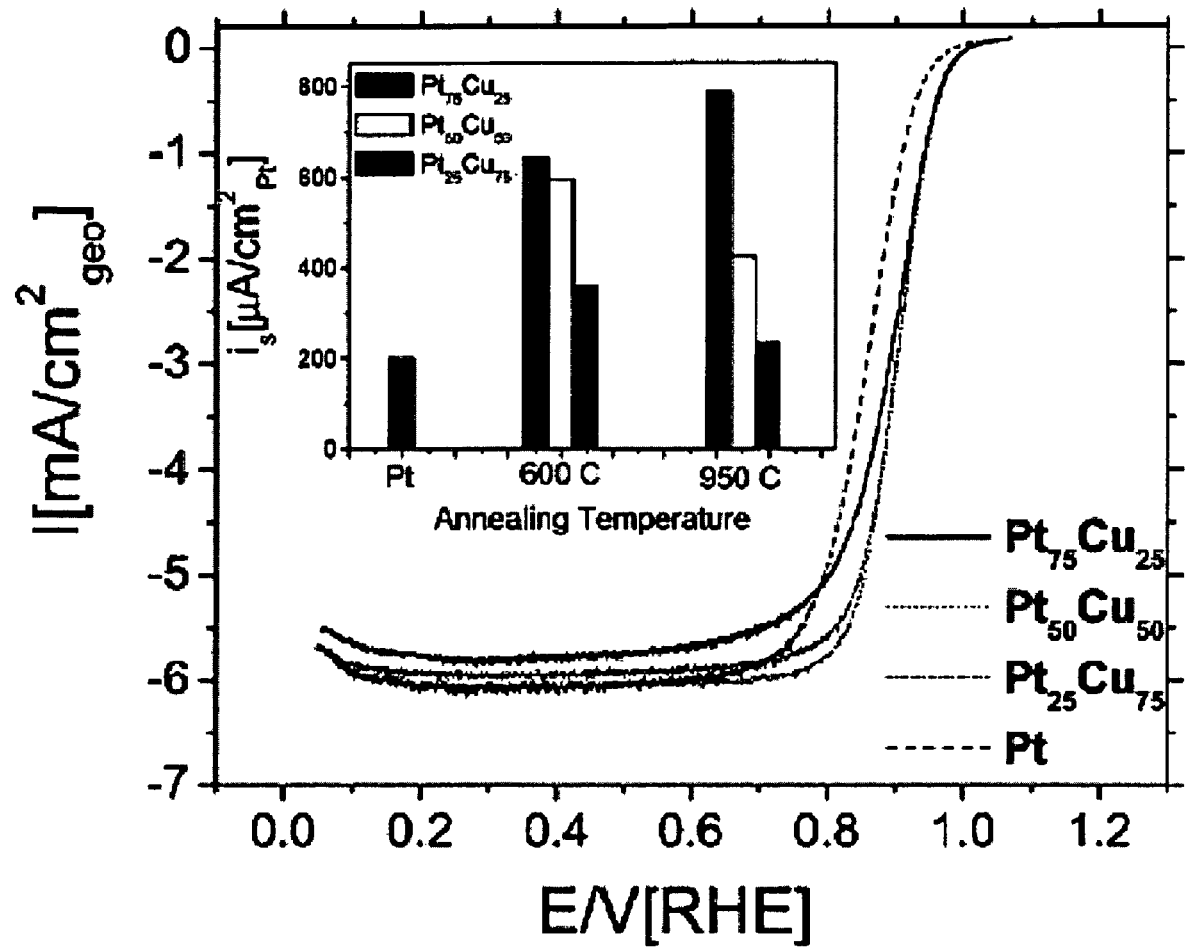
FIG. 10 demonstrates the voltammetric curves of de-alloyed bimetallic nanoparticles.

Six Pt—Cu bimetallic precursor alloy nanoparticles with three different stoichiometries: $Pt_{25}Cu_{75}$, $Pt_{50}Cu_{50}$, $Pt_{75}Cu_{25}$, were annealed at two different temperatures: 950° C. and 600° C. The nanoparticles were electrochemically de-alloyed and subsequently subjected to slow anodic potential sweeps in oxygen saturated electrolyte in order to characterize their intrinsic oxygen reduction reaction (ORR) activity. Combined with the reduced Pt amounts of the alloy catalysts in the RDE film, a kinetic analysis resulted in a 4-5 fold increase in the Pt-mass normalized ORR reactivity for the Curichest low temperature catalyst compared to the established 0.10 $A/mg_{Pt}$ of pure Pt at 0.9 V/RHE 30. These results are highlighted in Table 2 and FIG. 10. This dramatic

TABLE 2

| Catalyst | Norminal composition (at. %) | | Annealing temperature | Specific activity | Pt mass activity | Surface area | Composition after electrochemical dealloying (at. %) | |
|---|---|---|---|---|---|---|---|---|
| | Pt | Cu | °C. | $\mu A\ cm^{-2}Pt$ | $A\ mgPt^{-1}$ | $m^2\ gPt^{-1}$ | Pt | Cu |
| 1 | 25 | 75 | 600 | 643.77 | 0.53 | 88.51 | 79 | 21 |
| 2 | 25 | 75 | 950 | 787.68 | 0.35 | 45.16 | 80 | 20 |
| 3 | 50 | 50 | 600 | 595.96 | 0.51 | 85.83 | — | — |
| 4 | 50 | 50 | 950 | 427.61 | 0.11 | 26.80 | — | — |
| 5 | 75 | 25 | 600 | 359.71 | 0.27 | 74.77 | 86 | 14 |
| 6 | 75 | 25 | 950 | 233.85 | 0.03 | 13.01 | 81 | 19 | increase is in line with previous RDE measurements of de-alloyed Cu-rich Pt—Cu nanoparticle catalysts. With increasing Pt content of the precursor material, the observed Pt mass activity dropped to values reported earlier for Pt rich alloys such as $Pt_{75}Ni_{25}$ or $Pt_{75}CO_{25}$. Catalysts prepared at high temperatures generally showed reduced Pt mass based ORR activity. Table 2 also reports the measured values of the Pt-ECSA and the Pt-ECSA normalized ORR activities of the three de-alloyed catalysts at 0.9 V/RHE. The $Pt_{25}Cu_{75}$ catalyst prepared at 950° C. exhibited an almost 4 fold intrinsic activity increase over pure Pt. Low temperature $Pt_{25}Cu_{75}$ and $Pt_{50}Cu_{50}$ catalysts showed slightly smaller activities, while both $Pt_{75}Cu_{25}$ and the high temperature $Pt_{50}Cu_{50}$ only showed a 1-2 fold increase in specific activity, similar to other Pt rich catalysts. The electrochemical surface areas of the de-alloyed catalysts indicate that none of the catalysts showed a significantly increased surface area compared to a standard carbon-supported Pt with about 77 $mm^2$. To the contrary, the higher annealing temperature led to a serious decrease of Pt-ECSA due to particle sintering.

Prepared at 600 and 800° C., the de-alloyed $Pt_{25}Cu_{75}$ catalyst precursors were found to exhibit a 4-6 fold activity advantage over a standard carbon supported 45 wt % Pt nanoparticle catalyst in terms of Pt mass-based (0.4-0.6 A mg-1 Pt) and Pt surface area-based activity (700-900 mA/$cm_2$ Pt). The current results provide insight into the relationship between the ORR reactivity and the Cu content of the electrocatalyst precursor alloy. The compositional data given in the last column of Table 2 evidences that Cu de-alloying does occur during voltammetric treatment of the Cu-rich Pt—Cu precursors, such as in Table 2: catalysts 1 and 2. The $Pt_{75}Cu_{25}$ catalyst precursor showed better corrosion stability and suffered less relative Cu loss. Annealed at 600° C., the de-alloyed active catalysts seem to maintain their high Pt-mass and specific activity, at least up to a Pt atomic ratio of 50%, as further illustrated in Table 2: catalysts 1 and 3. Annealed at 950° C., alloy particle growth generally reduced the ESCA that, in turn, reduced the Pt mass activity. The alloy phase uniformity, improved and the individual phase compositions approached that of the overall stoichiometry. The $Pt_{25}Cu_{75}$ 950° C. precursor characterized by the largest particle size and by uniform alloying, exhibited the highest intrinsic activity after Cu de-alloying; this is in agreement with recent MEA measurements of de-alloyed $Pt_{25}Cu_{75}$ catalysts. This suggests that a highly dispersed, uniformly alloyed $Pt_{25}Cu_{75}$ precursor may result in a favorable de-alloyed catalyst from both a Pt-mass and an intrinsic activity point of view.

The opposite relation between annealing temperature and intrinsic activity was observed for $Pt_{50}Cu_{50}$. This analysis shows that the alloy phase structure characteristics such as: ordered, disordered, multi phase or single phase, etc, significantly impact the catalytic activity of the resulting de-alloyed catalysts. The Pt-rich $Pt_{75}Cu_{25}$ precursors showed a familiar about 2-2.5 fold activity increase over pure Pt at low annealing temperatures. Pt-rich alloys annealed at high temperature (large particles) did not show any activity advantage at all.

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims that follow, that scope including all equivalents of the subject matter of the claims. The discussion of a reference in the Description of the Related Art is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A method for forming catalyst nanoparticles, comprising:
   preparing at least one precursor suspension;
   admixing a metal with the at least one precursor suspension to form a mixture;
   drying the mixture to form a powder;
   annealing the powder to form a catalyst precursor;
   suspending the catalyst precursor in a solvent to form a catalyst ink;
   coating a medium with the catalyst ink; and
   de-alloying the catalyst precursor to form active catalyst nanoparticles.

2. The method of claim 1 wherein preparing at least one precursor suspension comprises adding at least one metal salt to a solvent.

3. The method of claim 2 wherein the at least one precursor suspension comprises at least one metal salt chosen from the group consisting of metals in Group IIB, Group IB, Group VIII, Group VIIB, and combinations thereof.

4. The method of claim 1 wherein the at least one precursor suspension comprises at least one metal chosen from the group consisting of gold, silver, nickel, palladium, chromium, molybdenum, manganese, titanium, scandium, tungsten, vanadium, and alloys thereof.

5. The method of claim 1 wherein admixing a metal with the at least one precursor comprises admixing platinum.

6. The method of claim 1 wherein the step of drying the mixture comprises freeze-drying.

7. The method of claim 6 wherein freeze-drying further comprises applying a vacuum.

8. The method of claim 6 wherein freeze-drying comprises freeze-drying at a temperature of at least about −10° C.

9. The method of claim 1 wherein annealing comprises heating the powder to a temperature of at least 600° C.

10. The method of claim 1 wherein suspending the catalyst precursor comprises forming a dispersion.

11. The method of claim 1 wherein suspending the catalyst precursor further comprises admixing a copolymer.

12. The method of claim 11 wherein admixing a copolymer comprises dispersing the copolymer in the catalyst ink.

13. The method of claim 1 wherein coating a medium comprises coating a membrane.

14. The method of claim 1 wherein de-alloying the catalyst precursor comprises electrochemical de-alloying.

15. The method of claim 1 wherein de-alloying the catalyst precursor comprises forming a membrane electrode assembly.

16. The method of claim 1 wherein de-alloying the catalyst precursor comprises assembling at least one electrochemical cell, the cell comprising at least one membrane electrode assembly.

17. The method of claim 16 wherein assembling the electrochemical cell further comprises temperature cycling the electrochemical cell.

18. The method of claim 17 wherein assembling the at least one electrochemical cell further comprises electrically cycling the potential of the electrochemical cell between about 0.1 V and about 3.0 V.

19. The method of claim 18 wherein cycling the potential of the electrochemical cell comprises cycling the potential from about 100 to about 500 times.

20. The method of claim 1 wherein de-alloying the catalyst precursor further comprises soaking the catalyst precursor in acid with a concentration from about 0.25M to about 2M.

21. The method of claim 20 wherein soaking the catalyst particles in acid comprises soaking in an acid chosen from the group consisting of acetic acid, hydrochloric acid, nitric acid, sulfuric acid, perchloric acid, hydrobromic acid, hydroiodic acid, and combinations thereof.

22. The method of claim 1 wherein the step of de-alloying the at least one catalyst precursor comprises chemical de-alloying.

23. The method of claim 22 wherein chemical de-alloying the at least one catalyst precursor comprises treating the precursors in an acid chosen from the group consisting of acetic acid, hydrochloric acid, nitric acid, sulfuric acid, perchloric acid, hydrobromic acid, hydroiodic acid, and combinations thereof.

24. The method of claim 23 wherein chemically de-alloying the at least one catalyst precursor comprises treating in an acid for from about 6 hours to about 48 hours.

* * * * *